US009317141B2

(12) United States Patent  (10) Patent No.: US 9,317,141 B2
Smoot et al.  (45) Date of Patent: Apr. 19, 2016

(54) MAGNETIC AND ELECTROSTATIC VIBRATION-DRIVEN HAPTIC TOUCHSCREEN

(71) Applicant: DISNEY ENTERPRISES, INC., Burbank, CA (US)

(72) Inventors: Lanny S. Smoot, Thousand Oaks, CA (US); Quinn Y. Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 221 days.

(21) Appl. No.: 13/874,228

(22) Filed: Apr. 30, 2013

(65) Prior Publication Data

US 2014/0268515 A1    Sep. 18, 2014

Related U.S. Application Data

(60) Provisional application No. 61/780,344, filed on Mar. 13, 2013.

(51) Int. Cl.
*G06F 3/0354* (2013.01)
*G06F 3/01* (2006.01)
*G06F 3/03* (2006.01)
*G06F 3/041* (2006.01)

(52) U.S. Cl.
CPC ............ *G06F 3/03545* (2013.01); *G06F 3/016* (2013.01); *G06F 3/0304* (2013.01); *G06F 3/03546* (2013.01); *G06F 3/0416* (2013.01)

(58) Field of Classification Search
CPC ....................................................... G06F 3/046
See application file for complete search history.

(56) References Cited

U.S. PATENT DOCUMENTS

| 2006/0209019 | A1* | 9/2006 | Hu .................................. 345/156 |
| 2010/0108408 | A1* | 5/2010 | Colgate et al. ............. 178/18.03 |
| 2013/0001873 | A1* | 1/2013 | Stromberg ................. 273/108.3 |

OTHER PUBLICATIONS

Kurtus, Ron, "Causes of Friction," Feb. 16, 2008, School for Champions, pp. 1-5.*

* cited by examiner

*Primary Examiner* — Gerald Johnson
*Assistant Examiner* — Maheen Javed
(74) *Attorney, Agent, or Firm* — Marsh Fischmann & Breyfogle LLP; Kent A. Lembke

(57) ABSTRACT

A system adapted for selectively attracting an object to and moving the object on a surface. The system includes an oscillating element including a contact surface such as a computer tablet with a touch screen or a table with a ferrous surface. The system includes a drive (or vibration inducing) assembly coupled to the oscillating element operable to oscillate the oscillating element to linearly move the contact surface first in a first direction and second in a second direction opposite the first direction (e.g., along an X-axis or Y-axis). The system further includes a preferential friction assembly operating to first create an attractive force between the contact surface and the object and second to modify the attractive force. This causes the object to move with the contact surface when the attractive force is created and the contact surface to move relative to the object when the attractive force is modified.

13 Claims, 15 Drawing Sheets

MAGNETIC AND ELECTROSTATIC VIBRATION-DRIVEN HAPTIC TOUCHSCREEN

RELATED APPLICATIONS

This application claims the benefit of U.S. Provisional Application No. 61/780,344, filed Mar. 13, 2013, which is incorporated herein in its entirety.

BACKGROUND

1. Field of the Description

The present invention relates, in general, to touchscreens and to techniques for selectively moving objects on a planar surface, and, more particularly, to a system that uses preferential friction on a vibrating or moving X-Y surface (e.g., an upper surface of a planar element such as a monitor or display) to provide a haptic touchscreen and to provide selective and controlled movement of objects supported by or on the X-Y surface.

2. Relevant Background

A touchscreen is an electronic visual display that a user can control through simple or multi-touch gestures by touching the screen with one or more fingers. Some touchscreens can also detect objects such as a stylus or ordinary or specially coated gloves. The user can use the touchscreen to react to what is displayed and to control how it is displayed. The touchscreen enables the user to interact directly with what is displayed, rather than using a mouse, touchpad, or any other intermediate device.

Touchscreens are common in devices such as game consoles, all-in-one computers, tablet computers, and smartphones. The popularity of smartphones, tablets, and many types of information appliances is driving the demand and acceptance of common touchscreens for portable and functional electronics. Touchscreens are popular in the medical field and in heavy industry, as well as in kiosks such as museum displays or room automation, where keyboard and mouse systems do not allow a suitably intuitive, rapid, or accurate interaction by the user with the display's content.

Today, touchscreens are pervasive and provide intuitive, visual ways to input information into tablet computers, cell phones, and all manner of electronic equipment. Touchscreen interfaces, however, do not normally provide tactile (or haptic) feedback that allows a user to determine the results of their interactions with the touchscreen surface. Recent industry efforts have added vibratory "clicks" to individual presses, e.g., in many cases, the entire device vibrates to indicate, for instance, a button press. Other industry efforts have used various types of high frequency vibration, often applied with piezoelectric actuators to the screen surface, to allow the user to "feel" the effect of a touch or a displayed surface texture. In this latter case, the computing device senses whether the user has hit some target (e.g., the area near an "enter" button) and then vibrates the screen to provide feedback to the user that the button area has been reached.

However, none of these approaches to a haptic touchscreen involves actually drawing (e.g., physically pulling or pushing) the user's finger in a direction based on the status of a controlling computer. Also, none of these touchscreen technologies actively position or move the person's hands or fingers on the touchscreen. Also, in existing touchscreens, there is no provision for individual objects (e.g., auxiliary physical game pieces) laying on the touchscreen to be able to be moved by the touchscreen itself in independent directions and at independent speeds.

SUMMARY

A system is taught herein for providing preferential (or changeable or differential) friction to objects contacting a vibrating surface. The "vibrating" surface may be, for example, an upper or contact surface of a moving X-Y element that is rapidly moved, in an alternating manner, in the X direction and then in the Y direction. The system may use a variety of technologies or techniques to selectively cause the object to grab or be attracted to the contact surface.

The object moves with the rapidly moving contact surface, in the X or in the Y direction, when the friction is higher to lock the object to the surface, but the contact surface moves without the object (underneath the object) when the friction is at a lower value. By selectively switching the friction or grabbing/locking force between the higher or lower value, the object can be moved about the contact surface in a controlled manner. If multiple objects are provided on the contact surface, each of the objects may be moved in an independent and/or individually controlled manner. A haptic touchscreen may be provided by moving the touchscreen in an X-Y manner and selectively applying an attractive (or friction) force to a user's finger (or hand or the like).

More particularly, a system is provided that is adapted for selectively attracting an object to and moving the object on a surface. The system includes an oscillating element including a contact surface such as a computer tablet with a touch screen or a table with a ferrous upper surface. The system includes a drive (or vibration inducing) assembly coupled to the oscillating element operable to oscillate the oscillating element to linearly move the contact surface first in a first direction and second in a second direction opposite the first direction (e.g., along an X-axis or along a Y-axis). The system further includes a preferential friction (or attraction or locking force producing) assembly operating to first create an attractive force between the contact surface and the object and second to modify the attractive force. In operations, this causes the object to move with the contact surface when the attractive force is created and the contact surface moves relative to the object when the attractive force is modified.

In some embodiments, the drive assembly includes at least one of the following: a mechanical vibrator mechanism, a solenoid, an internal vibration mechanism within the oscillating element, an assembly of two or more ultrasonic pillars abutting the oscillating element, a motor-rotated cam abutting one or more surfaces of the oscillating element, and a transducer (e.g., providing X and Y linear movement). The contact surface may be ferrous, and, in such cases, the object is an electromagnetic puck. Then, the preferential friction assembly includes a mechanism for selectively operating the electromagnetic puck to generate a magnetic field to provide the attractive force.

In some embodiments, the object is provided in the form a stylus with a tubular body, and the preferential friction assembly includes a roller ball contained at one end of the tubular body and a solenoid selectively operating a brake to resist rolling of the roller ball within the tubular body, whereby the stylus moves with the contact surface when the roller ball is placed in contact with the contact surface and the brake resists rolling. In some other cases, the object is a stylus with a perforated head positionable against the contact surface. The preferential friction assembly, then, may include a mechanism for selectively applying a vacuum force through the perforated head to the contact surface to provide the attractive force. In other embodiments of the system, the object includes a stylus with a body and a head in an extended outward position relative to the body positionable against the contact surface. In this embodiment, the preferential friction assembly may include a mechanism for retracting the head at least partially into the body and returning the head to the extended outward position. In yet other implementations, the preferential friction assembly includes an AC supply for selectively applying a voltage to the contact surface in a synchronized manner with operation of the drive assembly.

According to another aspect of the description, the system may include an object position monitoring assembly operable to monitor an X-Y position of the object relative to the contact surface. In such embodiments, the preferential friction assembly may operate based on the X-Y position of the object to time synchronize the creation of the attractive force with operation of the drive assembly. In many embodiments, the drive assembly further operates to oscillate the contact surface back and forth in a direction transverse to a direction of the oscillation moving the contact surface in the first and second directions. For example, a planar contact surface may be oscillated along the X-axis and also along the Y-axis or a cylindrical oscillating element with a curved contact surface may be oscillated along its longitudinal axis and also rotated for oscillation.

DETAILED DESCRIPTION

Figure 1A:
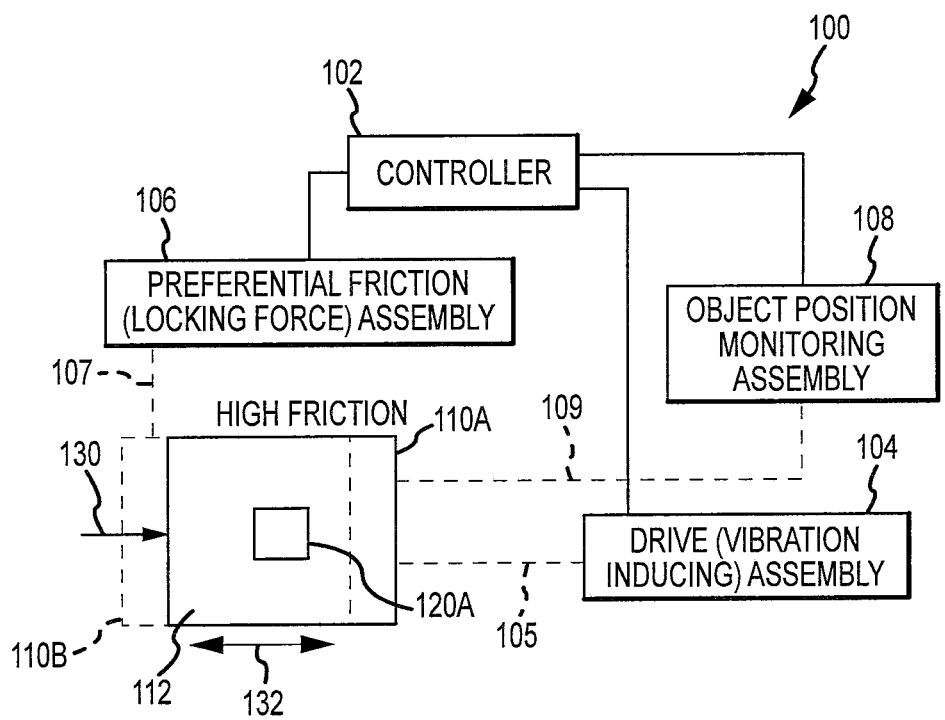
FIGS. 1A-1D illustrate functional block diagrams of an exemplary assembly or system using preferential friction (or a selectively applied locking or attractive force) combined with a rapidly vibrating contact or touch surface (a top or upper surface of a vibrating element/member such as a display or monitor) to walk or move objects in a controller manner.
Figure 1B:
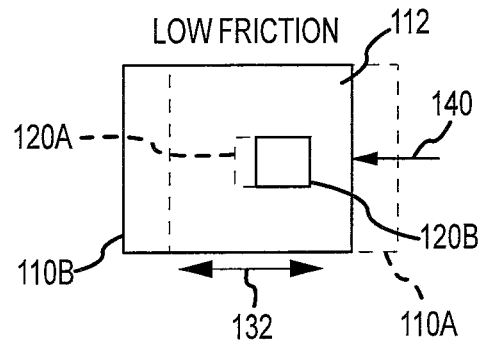

Briefly, the present description provides a system adapted for selectively applying a preferential friction or attractive/locking force to objects on or contacting a contact surface. The contact surface may be planar surface (e.g., the upper surface) of a vibrating element (e.g., a monitor, display device, a tablet, or the like). The member or element is caused to move first in an X-direction and then in a Y-direction (first direction and then an orthogonal second direction), and the movement is very rapid and the direction is alternated over time. By applying an increased friction or attractive/locking force to an object on the contact surface, the object can be caused to move with the vibrating element in the X or Y direction. Then, by lowering the friction or attractive/locking force, the object is released or unlocked from the contact surface, and the object remains in place (generally) while the vibrating member moves relative to the object in the X or Y direction. In this manner, an object can be moved about or positioned on the contact surface in a controlled manner (e.g., by controlling the application of increased friction or locking forces).

Prior to turning to the figures and particular implementations of an object positioning system (or haptic touchscreen system), it may be useful to more generally describe the inventive concepts and functions that facilitate such a system to be effectively implemented. The system can be thought of as applying a subtle horizontal vibration to the touch or contact surface in the X and Y directions while simultaneously either locking a finger or other object to the contact surface or releasing it in a manner phased to the X and the Y vibrations.

For instance, an electrostatic attraction may be used to lock or attract a finger (or a grounded object) to the contact surface of the vibrating element (e.g., a touchscreen device, a display device, a game component, or the like) during a first stroke of a horizontal vibration. Then, during the return or second stroke of that vibration, the electrostatic attraction may be released (or lowered to some preset lower value) so that the entire contact surface essentially slides under the finger or other object, and then the cycle may start over. Each "ratcheting" movement of the finger or object provides only a small movement of that object with respect to the contact surface, but the system can operate very rapidly (e.g., at KHz rates or other higher frequencies). Hence, the cumulative effect can be large displacement in any direction as the electrostatic (or other attractive/locking force) can be phased with any combination of horizontal and vertical impulses.

If more attractive/locking force is desired, an analogous system may be built using a ferrous (e.g., magnetically attractable) surface such as a thin sheet of metal (to provide the contact or touch surface) and electromagnetic coils, which can controlled/operated to instantaneously adhere to or release themselves from the metallic contact surface.

FIGS. 1A to 1D illustrate a functional block diagram of an object positioning system (or preferential friction system)

100 in four operating states showing movement of an object in an X-direction. The system 100 is shown in FIG. 1A to include a controller 102, such as a computer or computing device with a processor performing particular functions described herein when running executable code or software programs provided in non-transitory computer readable medium or memory. The controller 102 may initiate and control operation of a drive (or vibration inducing) assembly 104, a preferential friction (or locking force) assembly 106, and an object position monitoring (or sensing) assembly 108. The system 100 further includes a vibrating element 110A and 110B such as an electronic display device or a ferrous sheet or the like with an upper or contact (or touch) surface 112 upon which one or more objects 120A-120D may be placed or supported.

FIG. 1A shows that during operation of the system 100 the controller 102 may use or operate the drive assembly 104, which may be physically connected or in contact with the element 110A as shown at 105 or be proximate enough to apply forces to the element 110A, to cause the element 110A to vibrate in the X-direction. This translational movement is shown with arrow 132 and with FIG. 1A showing the vibrating element 110A and 110B in first and second positions (first and second X-axis positions). The drive assembly 104 may take many forms to practice the system 100, and a number of useful embodiments for the assembly 104 for creating rapid movement (X and Y movements, for example) of the contact surface 112 are described below in the following examples.

The controller 102 may also operate the preferential friction (locking force) assembly 106, which may be connected (wired or wirelessly) to the element 110A or object 120A as shown at 107, to selectively generate or apply an attractive or locking force between the object 120A and the contact surface 112 (or to the vibrating element 110A). For example, the object 120A may be switched between low and high friction states with the preferential friction assembly 106. As with the drive assembly, the preferential friction assembly 106 may take a number of forms to practice the system 100 with a main goal being that the applied or generated force be adequate to "lock" (make it relatively difficult for sliding to occur) the object 120A to the contact surface 112 and then "unlock" or release (make it relatively easy for sliding to occur) the object 120A from the surface 112.

Further, the controller 102 may use or operate the object position monitoring assembly 108 as shown at 109 to sense, determine, and/or monitor the position of the object 120A on the surface 112. A number of position monitoring technologies may be used to implement the assembly 108, with several options discussed in the following description. The position information (e.g., X-Y coordinates) may be used by the controller 102 (e.g., based on a position program or routine such as a portion of a video game) to operate the preferential friction assembly 106 at 107 to move or reposition the object 120A as explained below in more detail. The controller 102 and assemblies 104, 106, 108 are only shown in FIG. 1A (for simplicity of explanation and to avoid repetition) but should be understood to also be in use in the system 100 shown in FIGS. 1B-1D as well as the system 200 of FIGS. 2A and 2B (and other systems taught herein).

FIGS. 1A to 1D are useful for explaining operation of the system 100 with the system 100 being operated through 2 full strokes, e.g., the arrow 132 shows that the vibrating element 110A and 110B moves back and forth along a first axis (i.e., in the X-direction or along the X-axis in this example) and a "stroke" may be the combination of a movement to the right and then a movement back to the left. FIG. 1A shows the vibrating element 110A in a first horizontal position (moved to the right) and, with dashed lines, the vibrating element 110B in a second horizontal position (the position to the left or along the X-axis where the surface 112 was originally prior to movement to position 110A). This movement is repeated as the element 110A and 110B is vibrated or moved back and forth in an oscillatory manner by the drive or vibration assembly 104 as shown at 105.

With reference to FIG. 1A, the vibratory element or member is moved to the right, as shown at 110A and 110B, by a force 130 applied by the drive assembly 104. Concurrently, the preferential friction assembly 106 is operated to create high friction (or a locking force) between the object 120A, and this high friction operating mode of system 100 causes the object 120A to be essentially adhered to the contact surface 112 by high friction (which may be adjustable via assembly 106 and controller 102 to suit the object 120A and/or surface 112) with surface 112. As a result, the object 120A moves 132 with the surface 112 (as the vibratory element moves from 110B to 110A).

Once (or towards the end or second half of this first or right-moving half of the stroke) the table/element is moved to the right as shown with reference number 110A, the controller 102 may operate the preferential friction assembly 106 to create a lower amount of friction between the object 120B and the surface 112 (e.g., to release the locking or attracting force). Concurrently, surface 112 is moved, such as with substantially high acceleration, by operation of the drive assembly 104 from a first or right-most position of element 110A to a second or left-most position of element 110B (back to its starting position) via application of force 140. During this phase of operation or second half of the full stroke of system 100, the friction between the object 120B is reduced using the assembly 106 and object 120B maintains its approximate position (with respect to the Earth) due to its inertia. As a result, the object 120B has shifted a distance to the right with respect to contact surface 112 (i.e., has positive translational movement relative to the X-axis).

Figure 1C:
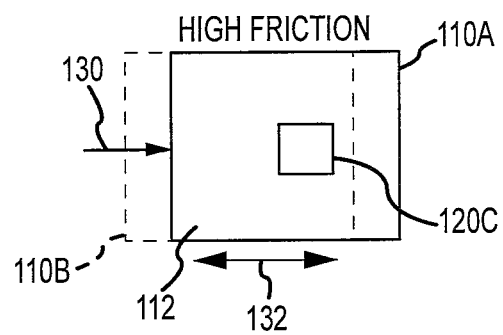

The cycle is repeated or a new stroke begins in FIG. 1C where the force 130 is applied again by the drive assembly 104 to again move the surface 112 to the right as shown with the element 110A moved from the prior or left-most position . Concurrently, the controller 102 operates the preferential friction assembly 106 to provide higher friction between the surface 112 and the object 120C (e.g., a magnitude of friction that is adequate to at least partially lock the object 120C upon the surface 112 such that the object 120C moves at least a fraction of the distance to the right with the surface 112).

Figure 1D:
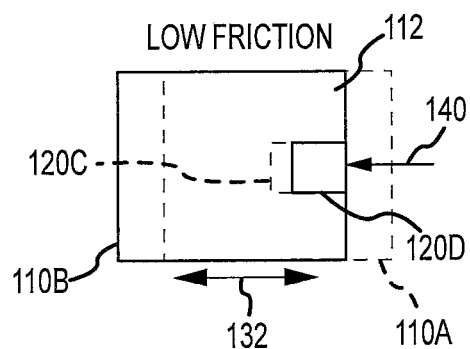

Next, as shown, in FIG. 1D, the return force 140 is again applied by the drive assembly 104 on element 110B to move it a distance to the left (from a first X-coordinate/position as shown in FIG. 1C to a second X-coordinate/position).The locking force or higher friction is removed by the operation of preferential friction assembly 106 to place the system 100 in a low friction state or operating mode. As a result, the object 120D maintains its approximate position relative to the Earth but as shown in FIG. 1D the object 120D has moved to the right relative to the oscillating surface 112. In this manner, the object 120A-120D can be walked across the surface 112 in either direction along the X-axis or moved in X direction (positive or negative). With the object position monitoring assembly 108, the X coordinate or location of the object 120A-120D can be determined over time, and the controller 102 may selectively operate the preferential friction assembly to move the object 120A-120D some distance to the left or right over time.

Figure 2A:
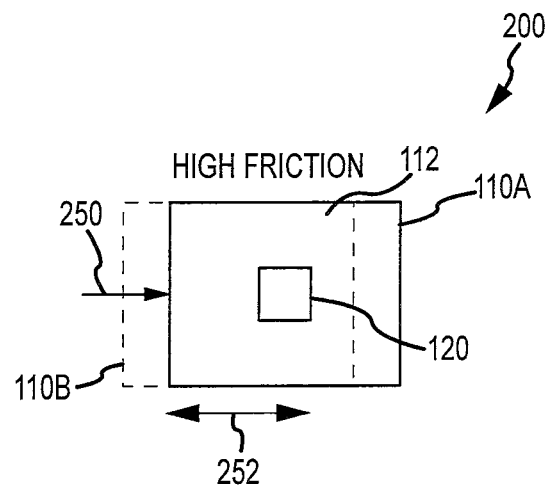
FIGS. 2A and 2B illustrate functional block diagrams of an exemplary system for moving an object in both X and Y directions (concurrently or sequentially)
Figure 2B:
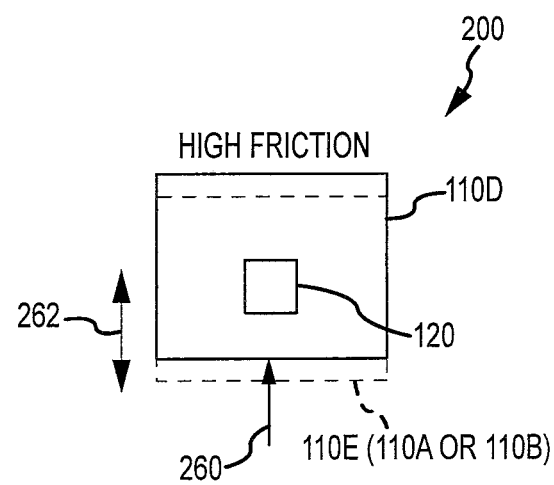

The concepts behind the system 100 may be used to move objects in arbitrary directions by creating any two transverse (or non-parallel) axes of movement. For example, FIGS. 2A and 2B show a system 200 being operated, respectively, to move an object 120 along a first axis (e.g., the X-axis) and then along a second axis transverse to the first axis (e.g., along the Y-axis). As shown, it may be useful to drive or vibrate a table or element 110A, 110B, 110D, 110E along orthogonal axes while selectively creating a high friction and a low friction state between the object 120 and the contact or upper surface 112 of the element 110A, 110B, 110D, 110E. This allows the system 200 to provide perpendicular or X-Y movement directions for the object, but it will be understood the system 200 may be configured to provide rotary and then axial movement to position an object 120.

As shown in FIG. 2A, the system 200 is operated to vibrate or oscillate 252 the contact surface 112 in the X-direction or move it back and forth along the X-axis. As shown in FIG. 2B, the system 200 is operated to vibrate or oscillate 262 in the Y-direction or move it back and forth along the Y-axis. If high friction is provided between the object 120 and the surface 112, the object 120 will move with the surface 112, e.g., from a first position of element 110B to a second position of element 110A and from a lower-most position of element 110E (e.g., with an X-axis position of element 110A, 110B as shown in FIG. 2A or a position there between) to an upper-most position of element 110D. Forces 250 and 260 are applied sequentially or fully or partially concurrently to shake 252, 262 the table in the orthogonal directions.

The amount of movement and direction of the object 120 on the surface 112 is controlled by how often and when the high friction state is exited (i.e., to release the locking force and allow the object 120 to remain in a new position rather than returning with the surface 112 in the second half of each stroke of the element 110A, 110B, 110D, 110E). The amount or magnitude of movement per step can be controlled by adjusting the amplitude of movement (distance traveled from a first position of element 110A to a second position of element 110B or from a lower-most position of element 110E to an upper-most position of element 110D), the number of oscillations, and/or the amount of acceleration per move (especially during the low friction portion of the movement where the surface 112 is free to slide under the object 120).

Figure 3:
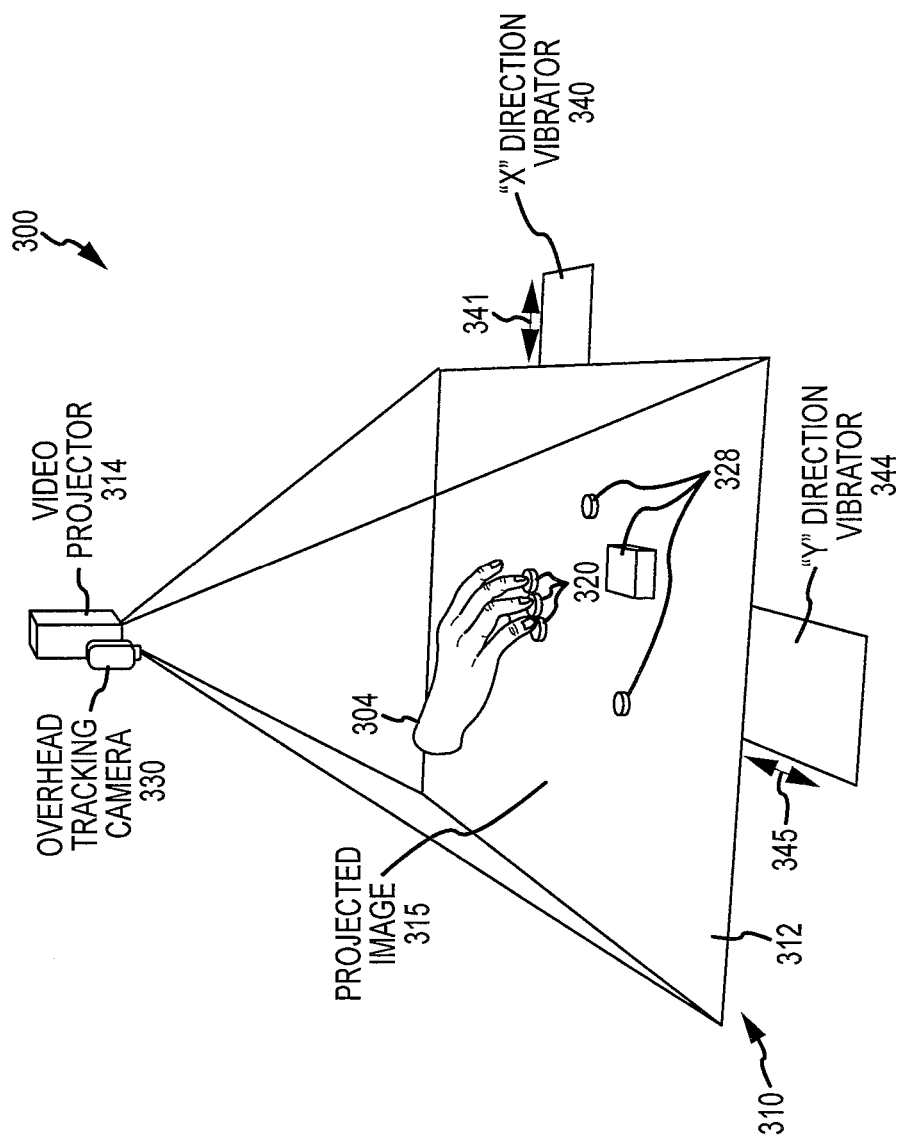
FIG. 3 illustrates an exemplary implementation of a preferential friction system to provide a magnetically-motivated haptic touch table.

FIG. 3 illustrates one exemplary preferential friction system 300 that is useful for explaining a technique for monitoring object positions, a technique for driving or vibrating a contact surface, and a technique for selectively locking objects to the contact surface. Particularly, FIG. 3 shows a vibrating or oscillating element 310 (e.g., a table, a tablet, or the like) with an upper, planar contact surface 312. The contact surface 312 may be formed, in this example, of a ferrous material such as by using a thin sheet of metal to provide a ferrous contact or touch surface 312. During operation of the system 300, the touch surface 312 may be made interactive in part by displaying images 315 upon the surface 312 such as with a projector 314 to provide a projected game image 315 on the surface 312.

The system 300 is made further interactive or provides a haptic touch table for a user or operator as they move pucks 320 with their hand 304 or fingers on the hand 304. For example, the mechanism in system 300 that is used to provide preferential friction or a locking/attractive force in a selective manner is magnetic. Particularly, the table top surface 312 is ferrous, and the pucks or user-movable objects 320 are electromagnetic elements (such as discs or the like) that can be selectively activated in a wired or wireless manner to generate a magnetic field between the pucks 320 and the ferrous touch surface 312.

The electromagnetic field is switched from on to off rapidly and selectively by a controller (as discussed above) to move the objects 320 about the surface, with "on" providing a force great enough to "lock" the pucks 320 to the surface 312 and "off" removing all or enough of the magnetic field to allow for easy sliding or movement relative to the vibrating surface 312. The pucks 320 may be provided on a per finger basis, such as by mounting within the ends of glove fingers and the glove being worn on hand 304, and the fingers on hand 304 associated with pucks 320 are moved relative to surface 312 based on computer or controller inputs. The game or system 300 may be made more interactive by providing non-user objects or free-ranging game pieces 328, which may also be pulsed electromagnetic pucks or objects that the game or system controller may move and position via a preferential friction assembly that operates to pulse or switch the pucks 328 on and off in a controlled manner. For example, the pieces 328 may be placed to form obstacles (e.g., a maze) on the surface 312 associated with the projected images 315 that much be maneuvered or interacted with by the hand 304 via the pulsed electromagnetic pucks 320.

Interactivity may be furthered or better controlled with the use of an object position monitoring assembly that includes an overhead tracking camera 330. The camera 330 may operate to monitor positions of the objects 328 and also the pucks 320. This information may be provided to a controller to operate the projector 314 so as to provide game images responsive to the movements of the objects 320 and/or 328. The information may also be processed by the controller to selectively operate or vary operations of the preferential friction assembly, which may include pulsing the electromagnetic pucks 320 in a different pattern to move or change positions of one or more of the pucks 320 relative to the ferrous contact surface 312.

In the system 300, the contact surface 312 is oscillated or vibrated in the X and Y directions through the use of a drive assembly that is made up of a pair of linear vibrators. Particularly, an X-direction vibrator 340 is used to oscillate 341 the element 310 and surface 312 back and forth a distance along the X-axis (right and left) during operation of the system 300 (as discussed above with reference to FIGS. 1A-2B). Similarly, a Y-direction vibrator 344 is provided that oscillates 345 the element 310 and contact surface 312 a distance in the horizontal plane along the Y-axis (up and down). For example, the two strokes of the vibrators 340, 344 (which may be mechanical shakers or similar devices) may be quite small (e.g., less than 0.25 inches) but be very rapid (e.g., frequencies into the ultrasonic range can be employed). The preferential friction assembly would be synchronized with the vibrators 340, 344 to select portions of the strokes to lock and release the objects 320, 328 by applying and then removing the electromagnetic field between the objects 320, 328 and the ferrous surface 312.

Figure 4:
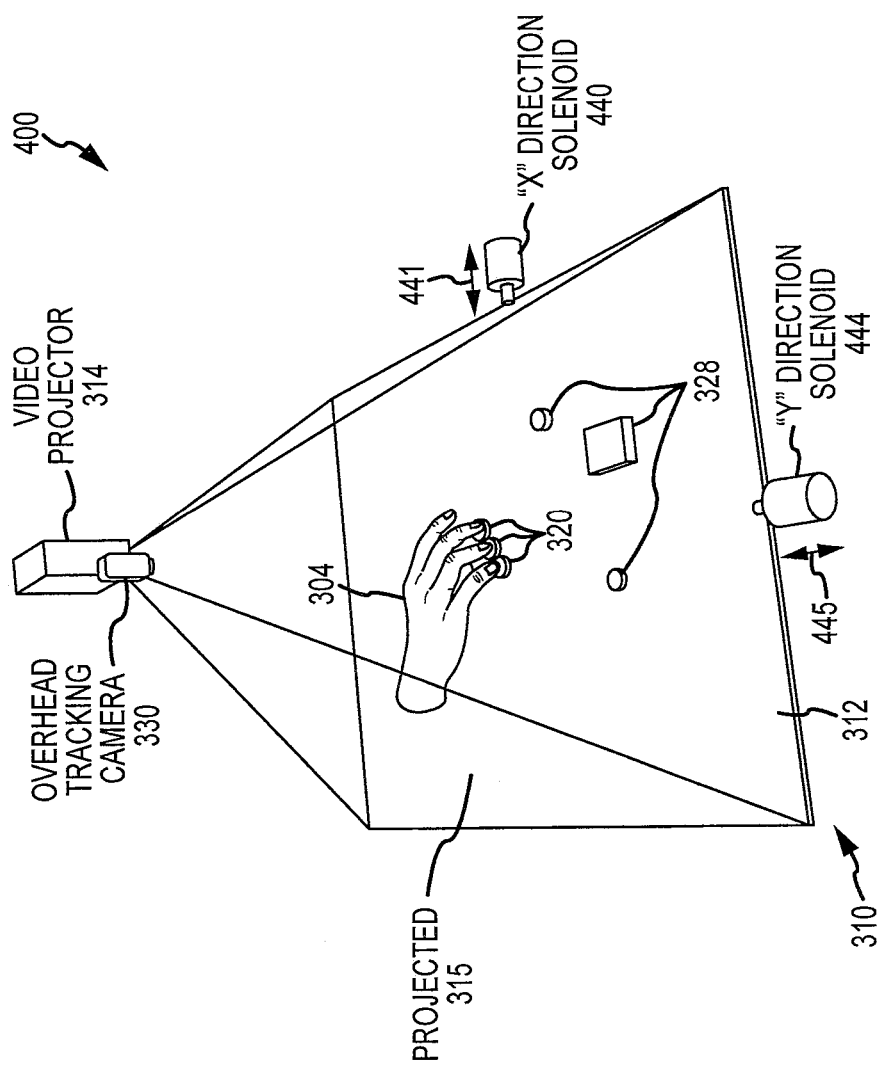
FIG. 4 provides a system similar to that shown in FIG. 3 but utilizing a different drive assembly for oscillating the contact or touch surface.

FIG. 4 provides a preferential friction system 400 similar to that shown in FIG. 3, with like components having similar numbering and not being discussed in detail here. The system 400 may be considered a solenoid-driven side shake haptic touch table. Particularly, the vibrators 340, 344 of system 300 are replaced with an X-direction solenoid 440 that is operable to oscillate or shake 441 the table 310 along the X-axis and with a Y-direction solenoid 444 that is operable to oscillate or shake 445 the table 310 and contact surface 312 along the Y-axis. As discussed above with reference to FIGS. 2A and 2B, the X and Y direction movements may be sequential (first perform a complete X-direction stroke and then a complete Y-direction stroke) or they may be partially or fully overlapping or performed concurrently.

The controller would be adapted to operate the wired or wireless preferential friction assembly to switch the electromagnetic pucks or objects 320, 328 on and off (pulse the magnetic field) in a manner that is time synchronized to the oscillating 441, 445 to obtain desired locking and movement of the pucks and objects 320, 328 during operation of the system 300 (e.g., based on a particular interactive game being played and on the positions determined by a position tracking assembly including the overhead tracking camera 330).

Figure 5:
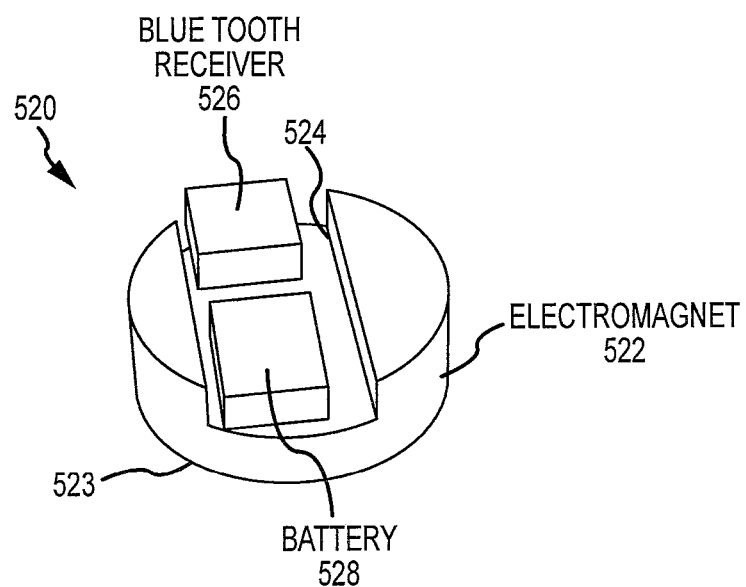
FIG. 5 illustrates one useful implementation for an electromagnetic puck or object for use in preferential friction systems of the present description.

The pucks or objects used in the preferential friction systems may take a wide variety of forms to practice the concepts taught herein. For example, though, FIG. 5 illustrates one implementation of an electromagnetic puck 520 that may be used in the systems 300 and 400 of FIGS. 3 and 4. As shown, the puck 520 includes an electromagnet 522 with a contact or lower surface 523 that would be placed proximate to or contacting the touch surface of the vibrating or oscillating element (e.g., contact surface 312 in FIGS. 3 and 4). The magnet surface 523 typically would be planar, and the electromagnet may be circular in shape as shown or rectangular or other shape.

A recessed surface 524 may be cut into or provide in the body of the electromagnet 522, and the puck 520 may include a wireless receiver (e.g., a Bluetooth receiver or the like) 526 for receiving control signals from a controller (or from a portion of a preferential friction assembly) to pulse or switch the electromagnet 522 on and off so as to apply a locking force to an underlying or nearby oscillating contact surface. A battery 528 may also be provided in the recessed surface 524 to power the electromagnet 522. In other cases, the receiver 526 and/or battery 528 may be provided on an outer surface of the electromagnet 522. In yet other implementations, the puck 520 may be a wired device rather than using a wireless receiver 526, and such wiring may also be used for powering the electromagnet 522 such that the battery 528 may or may not be provided on the puck 520.

Figure 6:
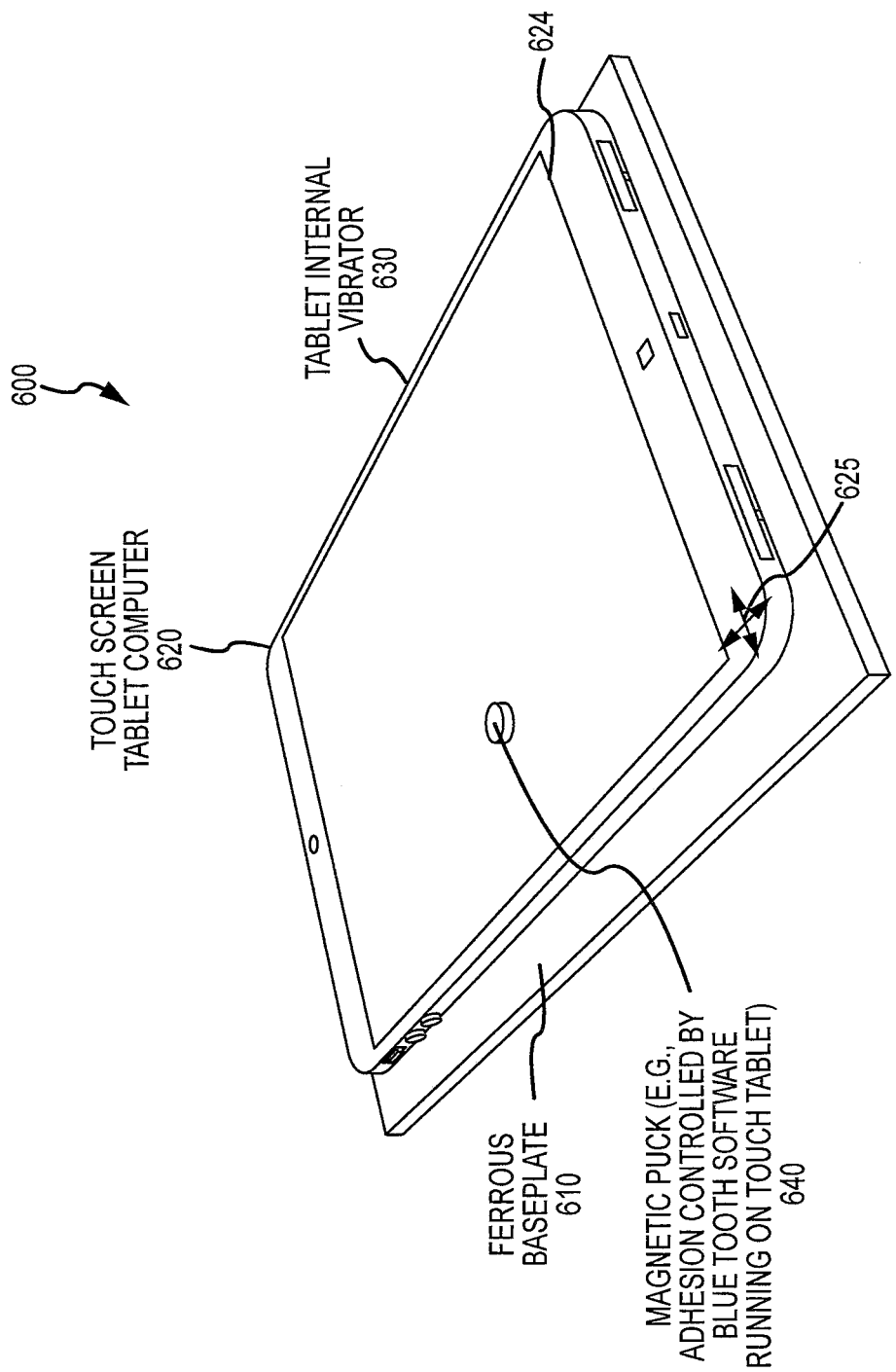
FIG. 6 illustrates a touch tablet embodiment of the concepts taught herein.

FIG. 6 illustrates a system 600 that may be considered a touch tablet embodiment of the present invention or description. In the touch tablet system 600, a device 620, such as a touchscreen tablet computer or game device, is provided and positioned over or proximate to a ferrous base plate 610. For example, the device 620 may be positioned with its touch or contact screen 634 parallel to the planar base plate 610 and with a back surface of the tablet/device 620 contacting or proximate to the base plate 610 (as shown). The device 620 is configured with an internal vibrator 630, e.g., a tablet computer 620 may be chosen for system 600 that includes a tablet internal vibrator. During operation of the system 600, the internal vibrator 630 may be operated to provide the oscillation or shake 625 (X and Y-axis shaking or X or Y direction movement) of the touch screen 624. In other embodiments, the base plate 610 may be shaken (e.g., with a drive mechanism as shown in other figures).

A magnetic puck or object 640 (e.g., as shown in FIG. 5 at 520) may be provided in the system 600 and placed on the touch screen 624. In this way, the vibrating element in the form of the tablet/device 620 is disposed between the electromagnetic puck 640 and the ferrous base plate 610. Adhesion or preferential friction is provided by an assembly to control movement of the puck 640 across the screen 624, and adhesion control may be via Bluetooth or similar wireless communications.

In some embodiments, the preferential friction assembly includes a module or software executing within the tablet computer 620 and providing control signals to a wireless receiver on the puck 640 to switch the magnetic field on and off with movement 625 of the touch surface 624. The object position monitoring assembly may include hardware and software of the touchscreen tablet computer 620 provided to allow the computer/device 620 to operate as a touchscreen, and the monitoring software may act to provide the position of the puck 640 relative to the touch surface 624. The touchscreen software/hardware may be used to control the preferential friction assembly/module to selectively switch the electromagnet of the puck 640 on and off (or to use the position of the puck 640 in an interactive game).

Figure 7:
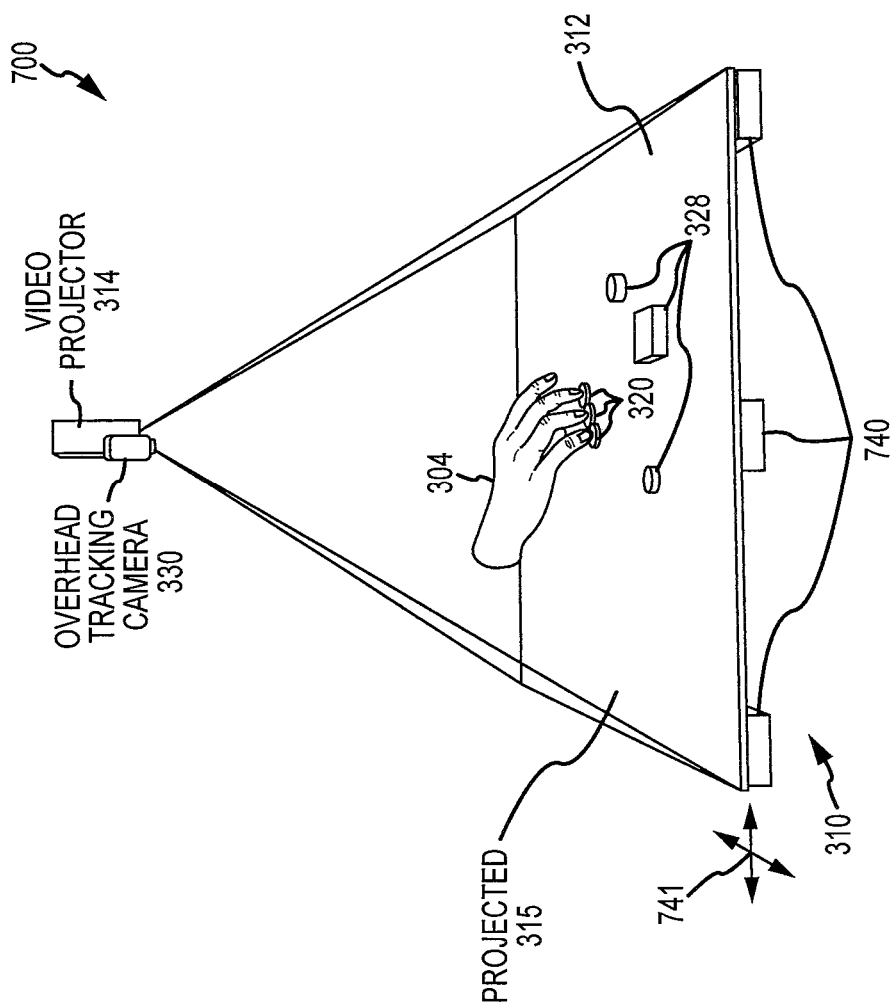
FIG. 7 provides another system similar to that shown in FIG. 3 but using a different drive assembly for oscillating the contact or touch surface.

FIG. 7 provides a preferential friction system 700 similar to that shown in FIGS. 3 and 4, with like components having similar numbering and not being discussed in detail here. The system 700 may be considered an ultrasonic pillar-driven haptic touch table. Particularly, the vibrators 340, 344 of system 300 are replaced with a plurality (e.g., 4 to 6 or more) of ultrasonic drive devices or "pillars" 740 that are operable in combination to oscillate or shake 741 the table 310 along the X-axis and the Y-axis. As discussed above with reference to FIGS. 2A and 2B, the X and Y direction movements may be sequential (first perform a complete X-direction stroke and then a complete Y-direction stroke) or they may be partially or fully overlapping or performed concurrently.

The controller would be adapted to operate the wired or wireless preferential friction assembly to switch the electromagnetic pucks or objects 320, 328 on and off (pulse the magnetic field) in a manner that is time synchronized to the oscillating 741 to obtain desired locking and movement of the pucks and objects 320, 328 during operation of the system 300 (e.g., based on a particular interactive game being played and on the positions determined by a position tracking assembly including the overhead tracking camera 330).

Figure 8:
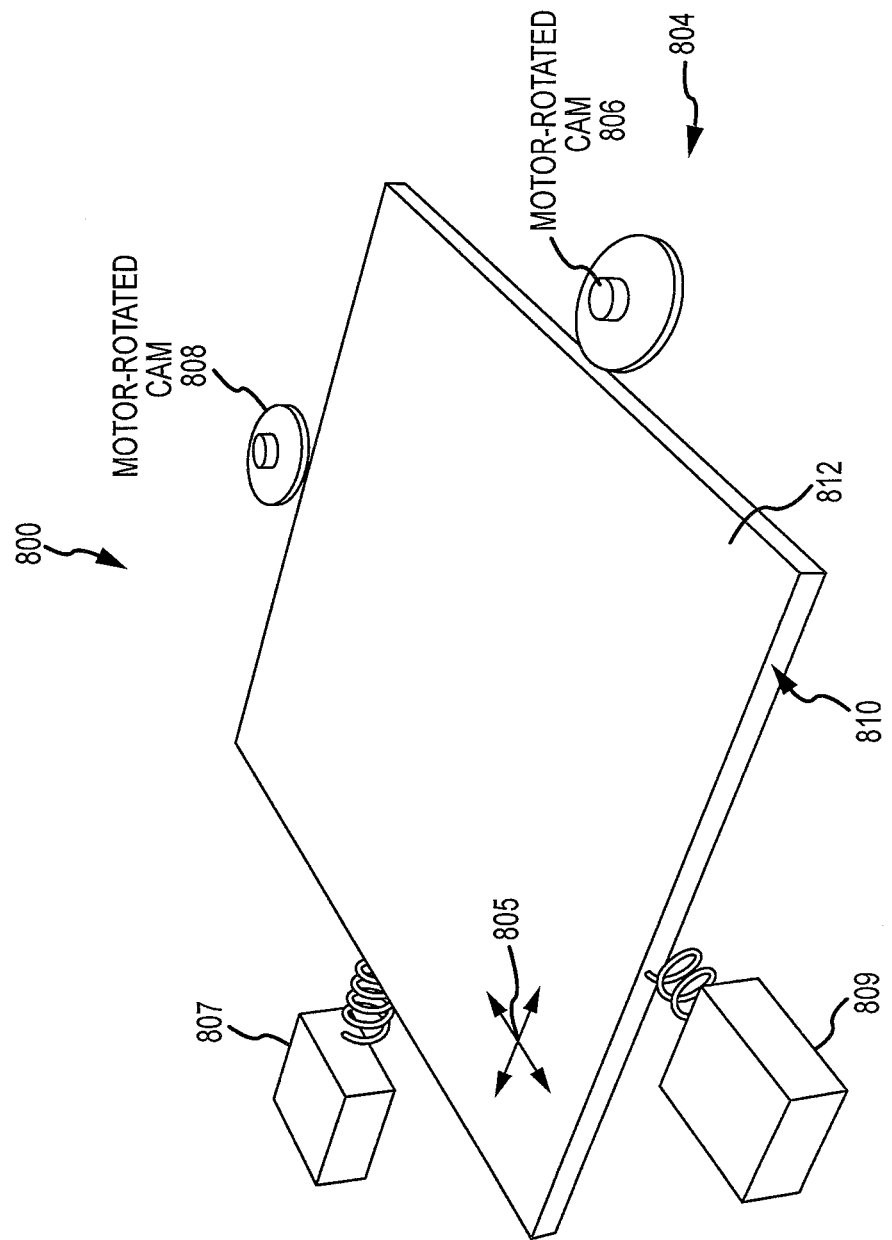
FIG. 8 illustrates another preferential friction system shown in simplified form (e.g., with the monitoring and preferential friction or locking force assemblies removed) that uses motor-rotated cams to oscillate the touchscreen.

FIG. 8 illustrates a portion of another preferential friction system 800 that may include the object position monitoring and other components such as the preferential friction assembly of other systems described herein to provide a haptic touch or selective positioning device. The system 800 is shown to include an oscillating or vibrating element 810 with an upper, planar touch/contact surface 812 upon which one or more objects may be provided for selective positioning and movement during operation of the system 800.

A drive assembly 804 is provided for vibrating or oscillating 805 the table/element 810 and its contact surface 812, e.g., to provide an X-Y vibrating surface 812. The drive assembly 804 is shown to include a first rotating cam (e.g., motor-driven cam) 806 that is rotated to push or move the table/element 810 in a first linear direction (e.g., in the X-direction), and a return element 807 such as a spring or similar device is used to return the table/element 810 back to its original position (e.g., perform the second half of each stroke).

Likewise, a second rotating cam (e.g., motor-rotated cam) 808 is provided that when rotated pushes or moves the table/element 810 in a second linear direction (e.g., in the Y-direction). A return element 809 is paired with the cam 808 to push upon the table/element 810 such as with a spring to return the table/element 810 and its contact surface 812 to its original location along this axis (to its starting Y-axis position), e.g., the return element 809 performs the second half of the stroke/oscillation in this direction. The cams 806, 808 may be operated sequentially or partially/fully concurrently, and objects on the surface 812 would be moved or positioned by operation of a preferential friction assembly (e.g., electromagnetic pulsing) that is synchronized with the movement 805 provided by the cam-based drive assembly 804.

Figure 9:
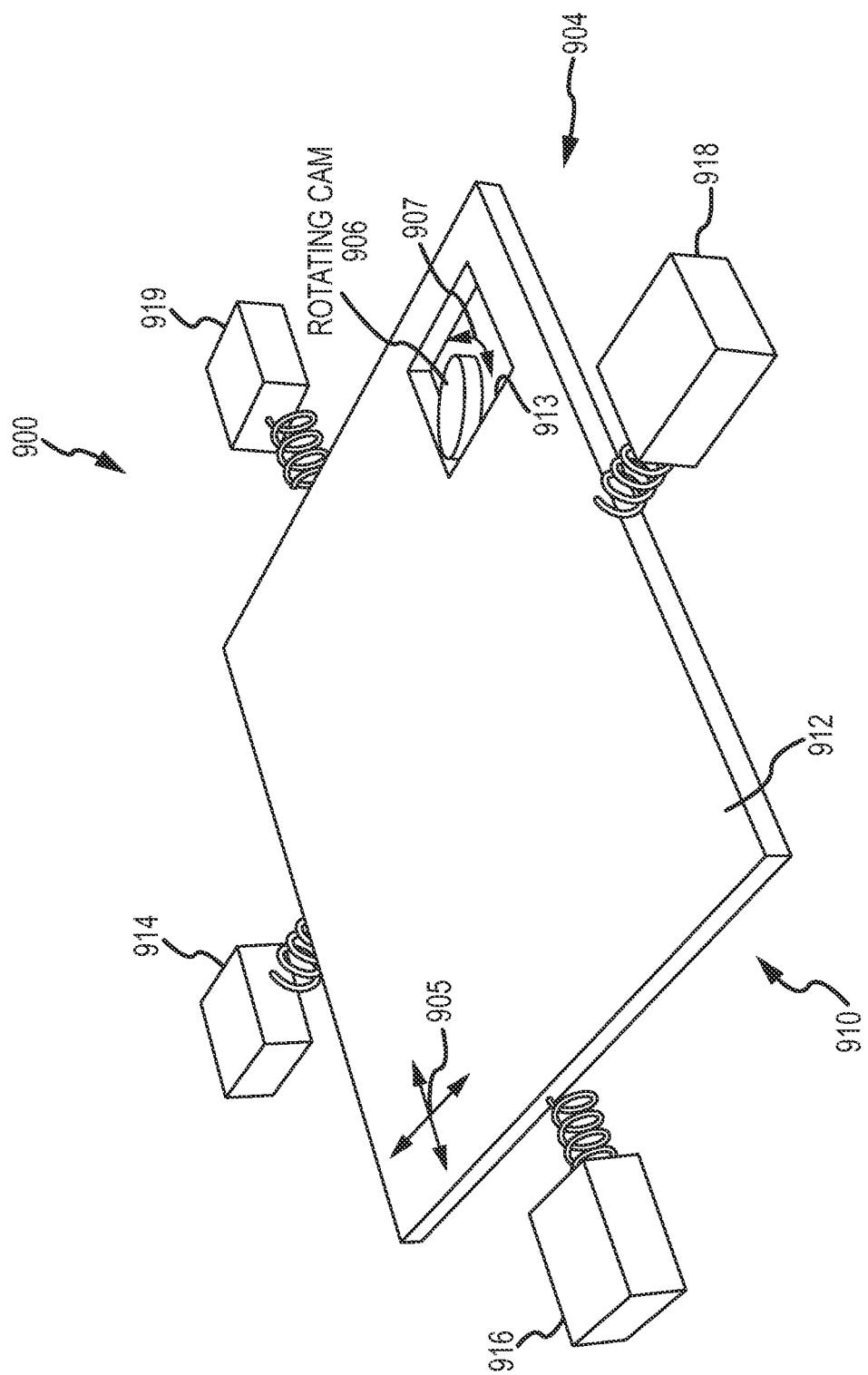
FIG. 9 illustrates a system similar to that shown in FIG. 8 that uses a single cam to vibrate or move the touchscreen.

FIG. 9 illustrates a portion of another preferential friction system 900 that may include the object position monitoring and other components such as the preferential friction assembly of other systems described herein to provide a haptic touch or selective positioning device. The system 900 is shown to include an oscillating or vibrating element 910 with an upper, planar touch/contact surface 912 upon which one or more objects may be provided for selective positioning and movement during operation of the system 900.

A drive assembly 904 is provided for vibrating or oscillating 905 the table/element 910 and its contact surface 912, e.g., to provide an X-Y vibrating surface 912. The drive assembly 904 is shown to include a rotating cam (e.g., motor-driven cam) 906 that is rotated within a rectangular, recessed portion 913 of the contact surface 912 of the table/element 910. As the cam 906 is rotated 907 it slams or whacks against each side of the rectangular recessed surface 913, and this abutting or whacking contact applies a force that pushes or moves the table/element 910 to oscillate in a first linear direction (e.g., in the X-direction) and in a second linear direct (e.g., in the Y-direction). A set of return elements (e.g., spring-based elements 914, 916, 918, and 919 contacting the edges or sides of the table/element 910) act to return the table 910 to the starting position or provide the second stroke in each of the X and Y directions. In this embodiment of the system 900, the X and Y travel 905 is typically sequential, and the puck/object would be selectively attracted or locked to the contact surface 912 to move the puck as the rotating cam 906 vibrates the surface 912 of the tablet/element 910.

Figure 10:
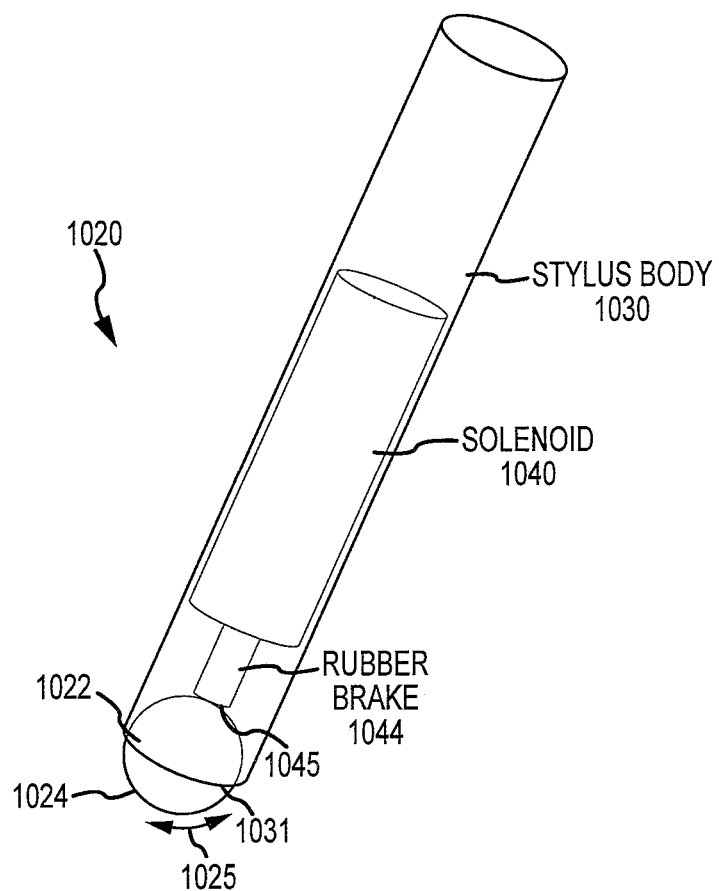
FIG. 10 illustrates a stylus-based object or element that may be used to provide contact with a vibrating touchscreen in a non-magnetic version of the preferential friction assembly of system of the present description.

FIG. 10 illustrates a contact element or assembly 1020 that may be used within a non-magnetic preferential friction assembly within any of the systems described herein (e.g., with any vibrating element with a contact surface). In this case, a touch or contact surface may be oscillating in the X and/or Y directions and the contact element 1020 may be held by a user or otherwise placed in contact with the contact surface. The contact element 1020 includes a roller ball 1022 that may be formed of a variety of materials such as a plastic, a rubber, a glass, or the like. The contact element 1020 includes a stylus body 1030 that may be generally tubular with a hollow central portion or lumen. The roller ball 1022 is supported within the tubular body 1030 with an end 1031 of diameter less than the diameter of the ball 1022 to allow a contact surface/portion 1024 of the ball 1022 to be exposed but retaining the ball 1022 within the body 1030.

The roller ball 1024 is generally free to rotate 1025 in any directions to allow free rolling on a contact surface of a vibrating element/table. To provide selective movement of the contact element 1020 with the moving/vibrating contact surface, the contact element 1020 further includes a solenoid or other actuator 1040 that is selectively operated (e.g., in response to wired or wireless signals from a controller or a communication device in a preferential friction assembly) to move an end 1045 of a brake 1044 into contact with the roller ball 1022 opposite the contact portion 1024. As a result, the ball 1022 stops rolling on the abutting contact surface, which is vibrating in the X or Y direction, and the ball 1022 and entire contact element 1020 are moved with the oscillating contact surface.

When the actuator/solenoid 1040 is operated to move the brake 1044 away from the roller ball 1022, the roller ball 1022 may again rotate 1025 which allows the vibrating surface to quickly move relative to the ball 1022 and stylus body 1030. By carefully timing the operation of the solenoid 1040, the contact element 1020 may be moved or selectively positioned relative to a vibrating touch surface in contact with the surface 1024 of the roller ball 1022. This can be achieved without the use of magnetic fields such that the contact surface does not need to be a ferrous sheet.

As discussed above, there are many modalities or ways to change the amount of friction between an object and a contact surface and nearly all of these may be used to implement a system of the present invention. For example, FIG. 11 shows a system with a table or element 1110 that may be made to oscillate 1113, as discussed above, in the X and/or Y directions so as to providing a vibrating or oscillating contact or touch surface 1112.

A stylus or other object 1120 may be provided that is placed with an end or portion 1148 in contact with the vibrating 1113 surface 1112. Particularly, the stylus 1120 may be configured to be a vacuum-based stylus with a standalone/local or with a remote vacuum supply/source to change the attractive force or friction between the contacting portion 1148 and the vibrating surface 1112. To this end, the stylus 1120 includes a body 1130, which may be a hollow tube or column. At one end, a perforated vacuum head 1148 may be attached to provide the contacting portion of the stylus 1120 for mating with the surface 1112, and the head 1148 may be adapted to provide controllable adhesion.

To this end, the stylus 1120 may include a vacuum chamber 1140 that may be switched on to provide an attractive or locking force (increased friction) to cause the head 1148 to lock onto the surface 1112 and the stylus 1120 to move with the contact or touch surface 1112. The vacuum chamber 1140 may also be turned off to release the head 1148 from the surface 1112 such that the surface 1112 would move 1113 underneath the head 1148 to change the relative position of the stylus 1120. The on and off switching may be achieved by a preferential friction assembly transmitting control signals to the vacuum chamber or source 1140 or, as shown, by operating a solenoid valve 1144 between the vacuum chamber 1140 and the vacuum head 1148. The solenoid valve 1144 may be adapted for responding to wireless control signals such as by taking the form of a Bluetooth-enabled control valve (e.g., a mini-solenoid valve or the like). Alternatively, the inverse of this technique may be used. That is, a puff of air can lift the end of the stylus from the surface to instantaneously decrease its friction from the rest position (in contact with the surface).

Figure 11:
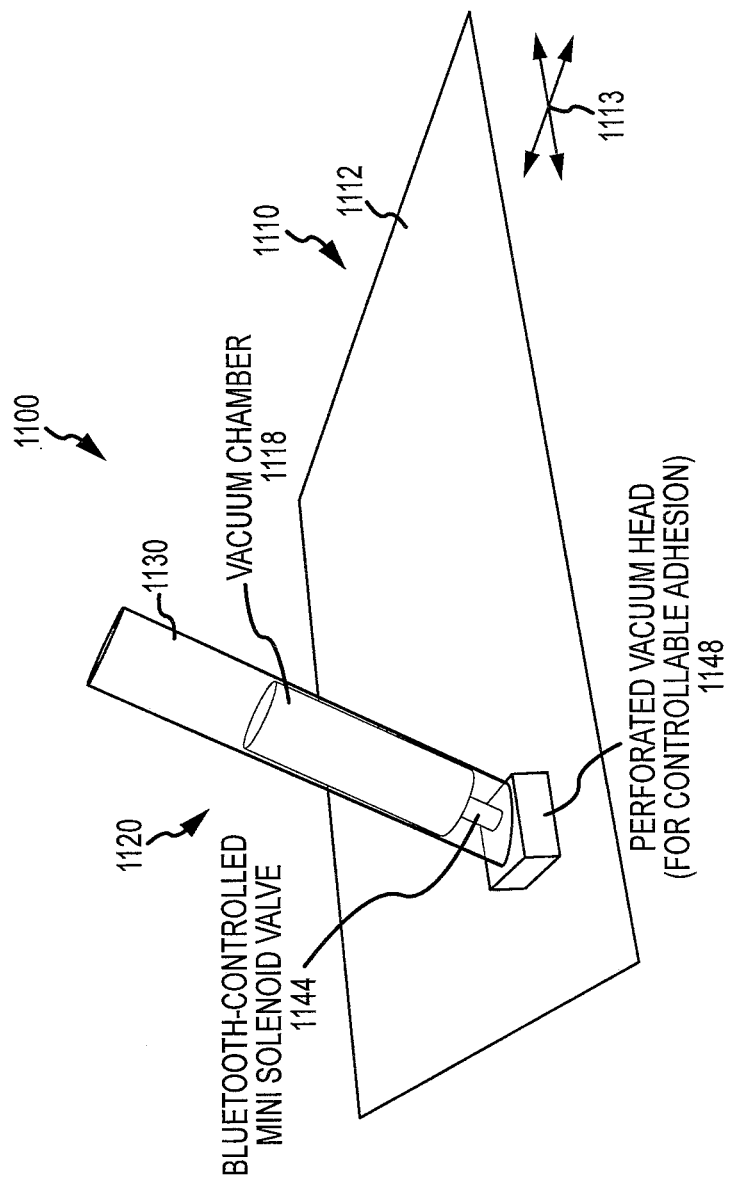
FIG. 11 illustrates another system for providing selective or preferential friction between an object and a contact surface.
Figure 12:
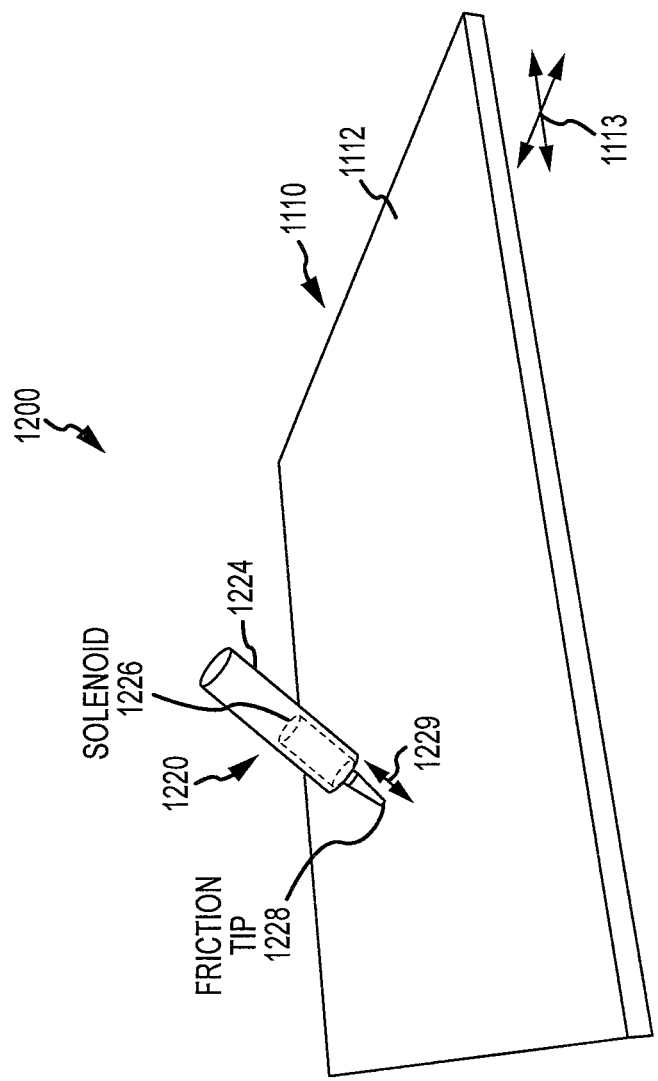
FIG. 12 illustrates yet another preferential friction system in which a hopping stylus is used to provide a different modality of providing changing friction or attractive forces between an object and a rapidly vibrating contact surface.

In FIG. 12, another system 1200 is shown that may utilize a vibrating element or shake table 1110 as found in the system 1100 of FIG. 11. In this system 1200, though, the vacuum-based stylus 1120 is replaced with a hopping-type stylus 1220. The hopping-type stylus 1220 includes a tubular body or barrel 1224 that may be held by an operator or by other means such that a friction tip or portion 1228 is near or against the contact surface 1112.

Within the barrel 1224, a solenoid or other actuator 1226 is provided that may be activated, in a wireless or wired manner, by control signals from a preferential friction assembly. In response, the solenoid 1226 vibrates 1229 the friction tip 1228, which may be a softer rubber or plastic body, up and down. This causes the friction tip 1228 to "jump" upward off the table/element 1110 just before the contact surface 1112 is moved 1113 in a first direction and then land on the surface 1112 to be moved 1113 with the table/element 1110 in a second direction. By synchronizing control of the actuator 1226 and "jumping" 1229 of the tip 1228, the stylus 1200 can be caused to hop to new positions relative to the surface 1112.

Figure 13:
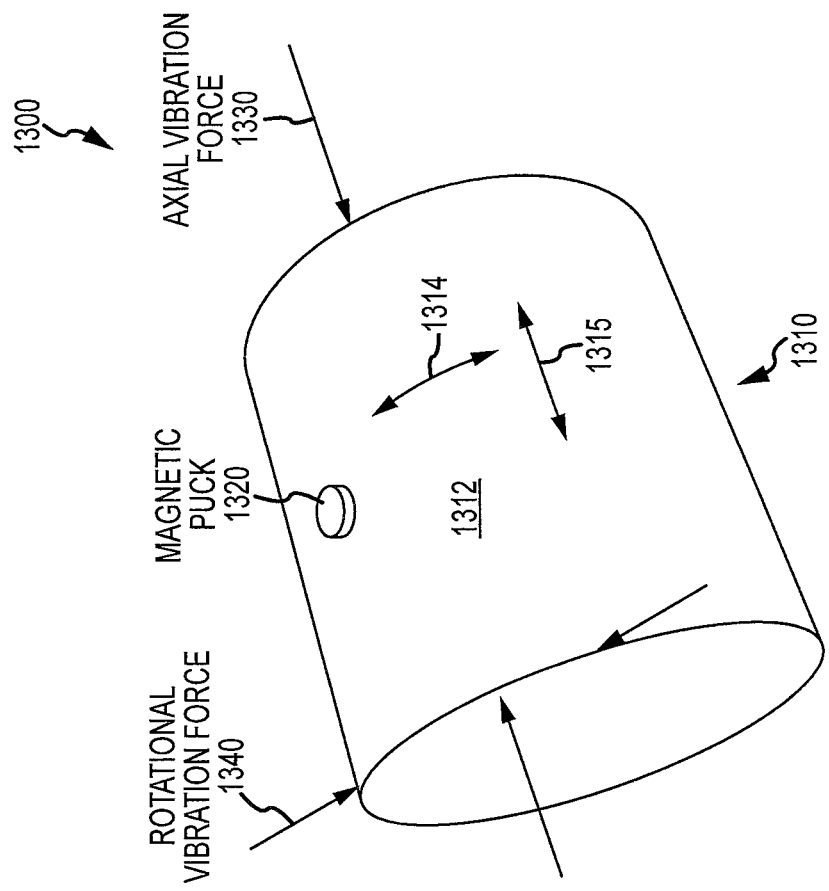
FIG. 13 illustrates a system in which the vibrating element is cylindrical in shape such that the contact surface is arcuate or curved rather than planar.

The above examples all illustrate planar contact surfaces, but it should be understood that the concepts described herein are not limited to such contact surfaces and any particular vibrating element shape (not just tables or tablets). FIG. 13 is useful for showing a different type of system 1300 along these lines. As shown, the system 1300 includes a vibrating element 1310 that is cylindrical in shape (or that may be semi-cylindrical in some embodiments) and provides an arcuate or curved contact surface 1312 upon which one or more objects 1320 may be supported and selectively positioned by modifying the friction or attractive force between the object 1320 and the surface 1312. For example, a preferential friction assembly may be included in system 1300 and configured to utilize magnetic forces, and, in this case, the surface 1312 may be a ferrous sheet or material and the object 1320 may be an electromagnetic puck as discussed above.

The system 1300 would include a drive assembly that is configured to rotate 1314 the surface 1312 and also move the surface 1312 axially or linearly as shown with arrow 1315 so as to provide a contact surface for the puck 1320 that is moved in two, transverse directions. Then, by selectively timing the operation of the magnetic puck 1320 or changing the attractive or locking force the puck/object 1320 may be moved about the contact surface 1312. To this end, the drive assembly would in a first operating mode apply a reciprocating axial force (axial vibration force) 1330 and in a second operating mode apply a reciprocating rotation force (rotational vibration force) 1340 upon the vibrating element 1310. When locked to the surface 1312, the puck 1320 would move with the surface 1312 as it is rotated by force 1340 (e.g., to move in a first direction) and as it is moved linearly or axially by force 1330 (e.g., to move in a second direction that is transverse or even orthogonal to the first direction), and the puck/object 1320 can readily be moved to any location on the surface 1312 in a controlled manner.

Figure 14:
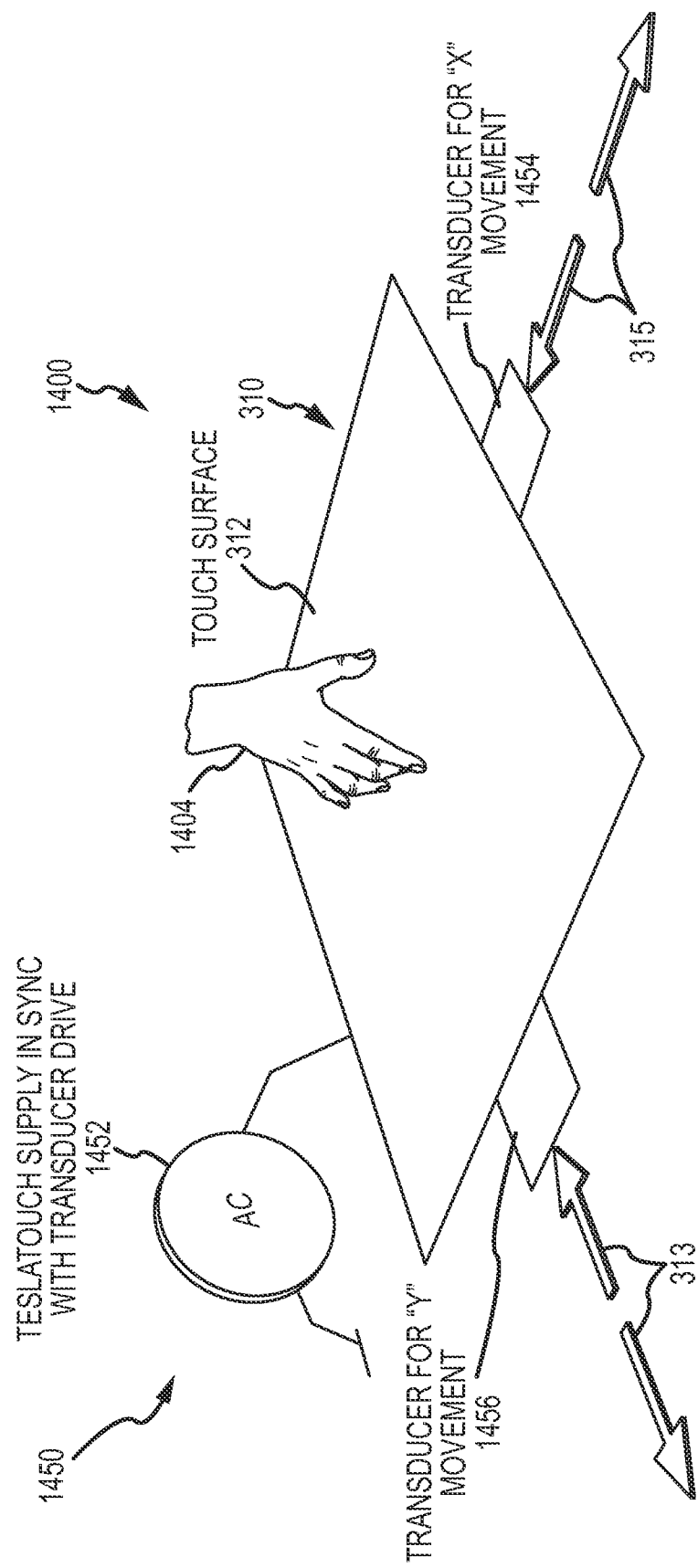
FIG. 14 illustrates a haptic X-Y push-pull system that uses AC power to create changing friction or attractive forces between an operator's fingertips/hand and an oscillating contact surface.

FIG. 14 illustrates a system 1400 that utilizes a table or other element 310 that may have a ferrous contact or touch surface 312 that is oscillated first in one direction 315 (e.g., for X-axis movement) and then in a second direction 313 (e.g., for Y-axis movement). To this end, a preferential friction assembly 1450 is provided that is adapted for inducing haptic X-Y "push-pull" on a fingertip or other body part 1404. The system 1400 uses a physical vibration provided by the drive assembly that provides a transducer 1454 for providing the X-axis movement 315 and a transducer 1456 for providing the Y-axis movement on the table/vibrating element 310 to provide a surface 312 that oscillates in transverse directions over time.

The physical vibration of the table/element 310 is combined with an alternating current (AC) supply 1452 that is electrically connected to the ferrous surface 312 (e.g., a TeslaTouch Supply or the like). The supply 1452 is synchronized with the transducer drive provided by transducers 1454, 1456 to alternatively push and pull on the figure tips/hand 1404 where it contacts the surface 312 to move/position the tips/hand 1404 relative to the surface 312.

The electrical drive algorithm for AC source 1452 and for the transducer-based drive assembly 1450 may be stated as the following: (a) AC supply 1452 is operated to apply a voltage to the touch surface 312 to increase the friction between the fingertip/hand 1404 and the surface 312; (b) transducer 1454 and/or transducer 1456 are operated to move the element 310 and its surface 312 with the fingertips/hand 1404 "locked" or "attached"; (c) the AC source is operated to apply voltage to the touch surface 312 so as to decrease the friction between the fingertip/hand 1404 and the surface 312 as the touch surface 312 is slid back underneath the fingertip/hand 1404 by the transducers 1454, 1456. The controller may act to repeat this drive algorithm in a ratcheting manner, and the increasing and decreasing of the friction is controlled to move the fingertips/hands 1404 in an X and/or Y direction.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The systems described herein provide several unique and potentially important features. In the case of magnetic actuation, individual playing pieces, which may be separate from a user's hand, can be independently moved around or positioned in an accurately controlled manner. The control is performed with knowledge of the current phase of movement of the touch or contact surface, and this may be done through direct wiring to the playing pieces, by infrared linking to a battery-operated electromagnetic piece, or by other techniques.

In addition, the hand (or individual fingers on the user's hand) can be directed into desired configurations. For instance, it is possible for a user moving electromagnetic-puck-mounted glove tips to feel the walls of a virtual box, to be drawn or pulled to a goal, or to be stopped by a virtual wall. This is shown in FIG. 3 where in an exemplary embodiment an overhead projector and camera are shown that may be used to track playing pieces as well as the outstretched fingers of a user's hand. Control over the magnetic force components may then be used to appropriately guide the playing pieces and user's hand(s) to proper or desired locations relative to the contact or touch surface. One feature of this system is that the holding force to the underlying metal sheet screen can be extremely high. That is, if an electromagnetic puck is turned on continuously, it will lock to the table top (contact surface) and be very difficult to move even by a user/operator. Thus, a maze of physical playing pieces, which may be driven into place by the system, would be a real obstacle for the user of the system as the playing pieces would form a true barrier to a user trying to push a puck past the obstacle created by the playing pieces.

Although the attractive or locking forces of the system can be quite high, the moving forces are typically limited to the strength of the actuators that are moving the vibrating element. Thus, the system is inherently safe since it will not supply huge sideways forces with large excursions to its human operators/users.

Many different types of attractive/locking or friction (or "sticktion") forces can be used in the systems described herein. For example, air suction down to a platform may be used as well as braked round and cylindrical wheels/balls and a writing stylus with a ball at the business/contact end that can both slide along the contact surface of the vibrating element and lock into place to be moved by the contact surface during the cycling movement of the vibrating element.

In some embodiments, a puck (or other object to be selectively moved) could be caused to appear to have a "spring constant" against movement. That is, a "puck" exerts a return force to a prior position dependent on how far it was pushed from that position. This may be achieved by a control system noting (determining and storing in memory) the distance the puck has moved from rest and applying whatever drive is required or useful to the puck to simulate "spring-like" behavior.

Although not specifically discussed, the movement of the object/puck may be selectively controlled to rotate the object/puck on the vibrating platform. Rotation may be achieved by providing an object or object assembly with two or more of the pucks described above (or of another form) on a base of the object's body (e.g., two pucks (Puck A and Puck B) provided at the ends of an elongate body or lower portions (table contacting/facing surfaces) of another shaped body). The controller may then operate the table (e.g., X and Y solenoids) to apply forces to the composite object or object assembly to turn it. For example, Puck A may have forces applied to it by the drive assembly (X and Y solenoids operated by a controller) shaking an oscillating element (e.g., a thin metal sheet) to move it in the positive X and positive Y directions. Concurrently, the oscillating element may be driven by the drive assembly to move Puck B of the object/object assembly in the negative X and negative Y directions. This type of concurrent (or nearly so) movement of the two or more pucks provided in an object/object assembly can be used to effectively rotate the object. Further, translation may also be provided to rotate and move the body of the object in any direction on the contact surface of the oscillating element.

There is a philosophical question regarding design and/or control that comes up if there is only a single piece on the surface to move, e.g., the case where a single puck is placed on a touch tablet as in FIG. 6. The system could be configured or controlled to have the puck turn on its own magnet to vary its friction as the table shakes. Alternatively, the entire surface can be made more or less magnetic while it shakes so as to move the single puck in any direction. For this single piece case, this may be expedient so that the piece can be completely passive (just a piece of "iron" or a ferrous object or not necessarily even a magnet).

The inventors further recognized that there is an alternative way of providing variable friction based on air pressure in the stylus configuration (see, FIG. 10). The above description stresses or fully describes "sucking" the stylus down. In other cases, though, as also is discussed above, a "puff" of air or other gas (e.g., a mechanism can be provided for selectively delivering a stream of gas flow through the perforated head of the stylus) can be applied to lift the stylus "hovercraft style" when it is desirable to decrease its normal "grounded" friction with the surface.

Further, there is a mode of operation or a configuration of a system that allows the individual pucks to be able to sense the movement of the platen under themselves (using for instance a built in accelerometer chip) to synchronize their own actions, e.g., increase/decrease adherence to the surface. This allows either completely autonomous motion or lightens the control data input since all that would be used would be to tell the puck which direction to go and it would, on its own, know how to go about "sticking" or not.

We claim:

1. A system for selectively attracting and moving an object on a surface, comprising:
   an oscillating element comprising a contact surface;
   a drive assembly coupled to the oscillating element operable to oscillate the oscillating element to linearly move the contact surface a first distance in a first direction at a first time and a second distance in a second direction at a second time opposite the first direction; and
   a locking force assembly operating to create an attractive force at the first time between the contact surface and the object and to decrease the attractive force at the second time, whereby, during the operation of the drive assembly to oscillate the oscillating element, the object moves, without a counteracting force applied to the object, the first distance with the contact surface when the attractive force is created and the contact surface moves relative to the object when the attractive force is decreased,
   wherein the created attractive force is of a first magnitude that attaches the object in abutting contact to the contact surface during the oscillating of the contact surface by the drive assembly,
   wherein the decreased attractive force is of a second magnitude less than the first magnitude whereby the object loses the attachment to the contact surface,
   wherein the object is an electromagnetic puck, and
   wherein the locking force assembly comprises mechanism for selectively operating the electromagnetic puck to generate a magnetic field to provide the attractive force.

2. The system of claim 1, further comprising an object position monitoring assembly operable to monitor an X-Y position of the object relative to the contact surface and wherein the locking force assembly operates based on the X-Y position of the object to time synchronize the creation of the attractive force with operation of the drive assembly.

3. The system of claim 2, wherein the object position monitoring assembly is further operable to monitor X-Y positions of one or more additional objects provided on the contact surface and wherein the locking force assembly operates based on the X-Y positions of the additional objects to time synchronize the creation of the attractive force with operation of the drive assembly to selectively position the object and the additional objects relative to the contact surface and to the X-Y positions of other ones of the object and the additional objects.

4. The system of claim 1, wherein the drive assembly further operates to oscillate the contact surface back and forth in a direction transverse to a direction of the oscillation moving the contact surface in the first and second directions.

5. The system of claim 1, wherein the drive assembly comprises at least one of a mechanical vibrator mechanism, a solenoid, an internal vibration mechanism within the oscillating element, an assembly of two or more ultrasonic pillars abutting the oscillating element, a motor-rotated cam abutting one or more surfaces of the oscillating element, and a transducer.

6. The system of claim 1, wherein the contact surface is ferrous.

7. A system, comprising:
   an electromagnetic puck;
   a positionable element with a planar contact surface supporting the electromagnetic puck;
   a vibration-inducing assembly operating to vibrate the positionable element, whereby the planar contact surface is oscillated along a first axis and is oscillated along a second axis transverse to the first axis; and
   a controller for selectively operating the electromagnetic puck to generate a magnetic field attracting the electromagnetic puck to the planar contact surface, wherein the magnetic field is of a magnitude great enough to attract the electromagnetic puck into abutting contact with the planar contact surface, whereby the electromagnetic puck is locked onto the planar contact surface and moves with the planar contact surface when the magnetic field is generated, and
   wherein the planar contact surface comprises a ferrous material.

8. The system of claim 7, wherein the planar contact surface comprises a touch screen of a computing device, wherein the vibration-inducing assembly is provided within a body of the computing device, and wherein the system further includes a ferrous plate positioned proximate to the computing device on a side opposite the touch screen.

9. The system of claim 7, further comprising a position monitoring assembly operable to determine an X-Y position of the electromagnetic puck on the planar contact surface and wherein the controller operates the electromagnetic puck to repeatedly generate the magnetic field to move the electromagnetic puck from the determined X-Y position to a differing predefined X-Y position.

10. A method of controllably moving an object on a contact surface, comprising:

first vibrating a body including the contact surface along a first axis;

second vibrating the body including the contact surface along a second axis transverse to the first axis;

positioning the object on the contact surface at a first position; and over a period of time and during the first and second vibrating, varying the magnitude of an attractive force between the object and the contact surface, whereby the object is moved from the first position to a second position relative to the contact surface, wherein the contact surface comprises a ferrous material, wherein the attractive force is a magnetic field and the magnitude is varied to selectively lock the object to the contact surface and release the object from the contact surface, wherein the object comprises an electromagnetic puck, and wherein the varying comprises selectively providing power to an electromagnet housed on the electromagnetic puck during the period of time.

11. The method of claim 10, further comprising monitoring a position of the object on the contact surface during the period of time and wherein the varying of the attractive force is performed based on the position monitoring.

12. The method of claim 10, wherein the object comprises two or more pucks positioned on a body, wherein the pucks are each selectively moved by first and second applications of the attractive force with the contact surface, whereby the first and second applications of the attractive force are selected to rotate the object about a vertical axis passing through a body of the object while the object is concurrently moved by translational movement from the first to the second position.

13. The method of claim 10, wherein the varying of the attraction force is performed in a time synchronized manner to at least one of the first vibrating and the second vibrating to move the object to the second position.

* * * * *